United States Patent
Chawla et al.

(10) Patent No.: US 12,556,942 B2
(45) Date of Patent: Feb. 17, 2026

(54) SYSTEM AND METHOD FOR SCALABLE MACHINE LEARNING MODELING

(71) Applicant: Verizon Patent and Licensing Inc., Basking Ridge, NJ (US)

(72) Inventors: Sidakpreet S. Chawla, Jalandhar (IN); Praveenkumar Balakrishnan, Chennai (IN); Sudeesh Sankaravel, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 537 days.

(21) Appl. No.: 18/053,875

(22) Filed: Nov. 9, 2022

(65) Prior Publication Data

US 2024/0155378 A1    May 9, 2024

(51) Int. Cl.
*H04W 24/02* (2009.01)
*H04L 41/16* (2022.01)

(52) U.S. Cl.
CPC ............. *H04W 24/02* (2013.01); *H04L 41/16* (2013.01)

(58) Field of Classification Search
CPC ....... H04W 24/02; H04L 41/16; H04L 41/145
See application file for complete search history.

(56) References Cited

U.S. PATENT DOCUMENTS

| | | | |
|---|---|---|---|
| 2018/0197200 A1* | 7/2018 | Zoldi | G06Q 30/0255 |
| 2018/0227930 A1* | 8/2018 | Ouyang | H04W 16/00 |
| 2020/0387565 A1* | 12/2020 | Caglar | G06N 3/082 |
| 2021/0103830 A1* | 4/2021 | Liu | G06N 5/04 |
| 2021/0294818 A1* | 9/2021 | Savalle | G06F 16/906 |
| 2022/0029892 A1* | 1/2022 | Hooli | H04L 41/0823 |
| 2022/0035672 A1* | 2/2022 | Vinod | G06F 9/5077 |
| 2022/0124560 A1* | 4/2022 | Yeh | H04W 28/18 |

(Continued)

FOREIGN PATENT DOCUMENTS

WO    WO-2023147877 A1 *    8/2023

OTHER PUBLICATIONS

Bergstra—Random Search for Hyperparameter Optimization (Year: 2012).*

(Continued)

*Primary Examiner* — Jinsong Hu
*Assistant Examiner* — Justin Barry (57) ABSTRACT

A method, a network device, and a non-transitory computer-readable storage medium are described in relation to a scalable machine learning modeling service. The scalable machine learning modeling service including receiving analytics datasets pertaining to a network services metric and collected for a plurality of network elements over past intervals; performing a clustering procedure to generate a plurality of clusters formed using the analytics data for the plurality of network elements, each cluster including multiple network elements; selecting a representative network element of the multiple network elements for each of the clusters; determining a set of model hyperparameters based on searching of hyperparameter spaces associated with each representative network element; applying the set of the model hyperparameters for tuning each of the multiple network elements in a cluster; and model training each of the multiple network elements in the cluster to score the network services metric for upcoming intervals.

20 Claims, 7 Drawing Sheets

(56) References Cited

U.S. PATENT DOCUMENTS

| | | | |
|---|---|---|---|
| 2023/0142927 A1* | 5/2023 | Natarajan | H04W 24/02 455/418 |
| 2024/0007541 A1* | 1/2024 | Yudowitch | H04L 41/145 |
| 2024/0031850 A1* | 1/2024 | Yan | H04W 52/0206 |

OTHER PUBLICATIONS

Fernandes et al. "Digital Signature to Help Network Management Using Principal Component Analysis and K-means Clustering" IEEE <https://ieeexplore.ieee.org/stamp/stamp.jsp?tp=&arnumber=6654912> (Year: 2013).*

* cited by examiner

SYSTEM AND METHOD FOR SCALABLE MACHINE LEARNING MODELING

BACKGROUND

Model training and scoring that involves a large number of entities presents various complexities due to the enumerable relevant factors to consider on an entity-by-entity basis. Further, automation of model hyperparameter tuning that maximizes model performance by minimizing statistical anomalies is equally challenging.

DETAILED DESCRIPTION

The following detailed description refers to the accompanying drawings. The same reference numbers in different drawings may identify the same or similar elements. Also, the following detailed description does not limit the invention.

Network operators and other entities may provide communications services via multiple networks, such as a radio access network (RAN), a core network, an application service layer network, an X-haul network, and/or another type of network. Additionally, the management of these networks relative to various network services metric criteria (e.g., power requirements, latency, throughput, bitrate, error rate, and the like) may depend on enumerable criteria and factors, such as configuration and resources of a network slice, radio quality, cell-level congestion, configuration and resources associated with RAN, core, and/or application service layer devices, reaction to dynamism in the RAN and/or the core network, scheduling and priority of traffic, transport configurations, among other variables. Given the complexities of forecasting model score values for network elements that number in the hundreds of thousands, non-scaled approaches to system-wide forecast modeling at a micro-level (e.g., performing hyperparameter tuning for every single model) may inefficiently forecast network service capabilities. Additionally, network modeling approaches may compromise accuracy in forecasting network usage, loads, types of traffic, and/or the like, based on the alternative selection of fewer model hyperparameters used to train the models. Additionally, time delays related to the training of models may prevent optimal network performance, as well as one-off anomalies in the datasets used by the models that may yield decreased performance.

According to exemplary embodiments, a scalable machine learning modeling service is described. According to an exemplary embodiment, the scalable machine learning modeling service may use artificial intelligence (AI) logic and/or machine learning (ML) logic (AI/ML logic) and historical data recorded for past intervals, to forecast network services over future intervals. According to an exemplary embodiment, the prospective network services information may pertain to a network slice, an end-to-end network path, a network device, a segment of a network path or network slice (e.g., radio unit (RU) to user plane function (UPF), etc.), a geographic area associated with a network service (e.g., a cluster of RAN devices, a cell of a RAN device, a sector of a RAN device, a sub-sector of a RAN device, a customer site, a data center), and/or another type of network element, for example. According to an exemplary embodiment, the prospective network services information may use representative network element selection for model hyperparameter tuning to mitigate the impact of anomalous data on individually trained forecasting models. According to an exemplary embodiment, the AI/ML logic may use network topology information, and historical and/or current network services metric value information to calculate the prospective network services information, as described herein.

According to an exemplary embodiment, the scalable machine learning modeling service may provide the prospective network services information to a network provisioning system. The network provisioning system may schedule the allocation of network resources and/or configurations at a local- or system wide-level based on the prospective network services information. The network provisioning system may use predicted network services metric information to execute network management in future time intervals, as described herein.

In view of the foregoing, the scalable machine learning modeling service may affect the efficiency of forecast modeling based on clustering of network elements. Additionally, unlike current systems, the scalable machine learning modeling service may perform model hyperparameter tuning of a selected representative network element rather than every network element in the cluster. Further, the scalable machine learning modeling service may enhance the management of forecasting services at a micro-level based on AI/ML models using a single hyperparameter combination to individually train each network element in the cluster without searching the hyperparameter space associated with each network element, as described herein.

According to an exemplary use case, the scalable machine learning modeling service may facilitate power distribution among wireless access stations (e.g., cell towers) according to anticipated power requirements based on the forecasting model and scoring system performed by the AI/ML logic and/or the network provisioning system. According to the exemplary use case, the individual training and forecasting of power needs across a system of more than one hundred thousand wireless access stations may be accomplished using on the order of 500 learned model hyperparameter combinations which are propagated to wireless access stations for which associated hyperparameter spaces were not searched. The scalable machine learning modeling service may be a solution for any scenario in which microlevel models are required, but due to insufficient reliable data and/or large quantities of models required, hyperparameter tuning for every single model is not feasible. For example, other use cases may be applied to any network resource, such as workstation devices, customer service level applications (e.g., Internet of things (IoT) devices), etc.

Figure 1:
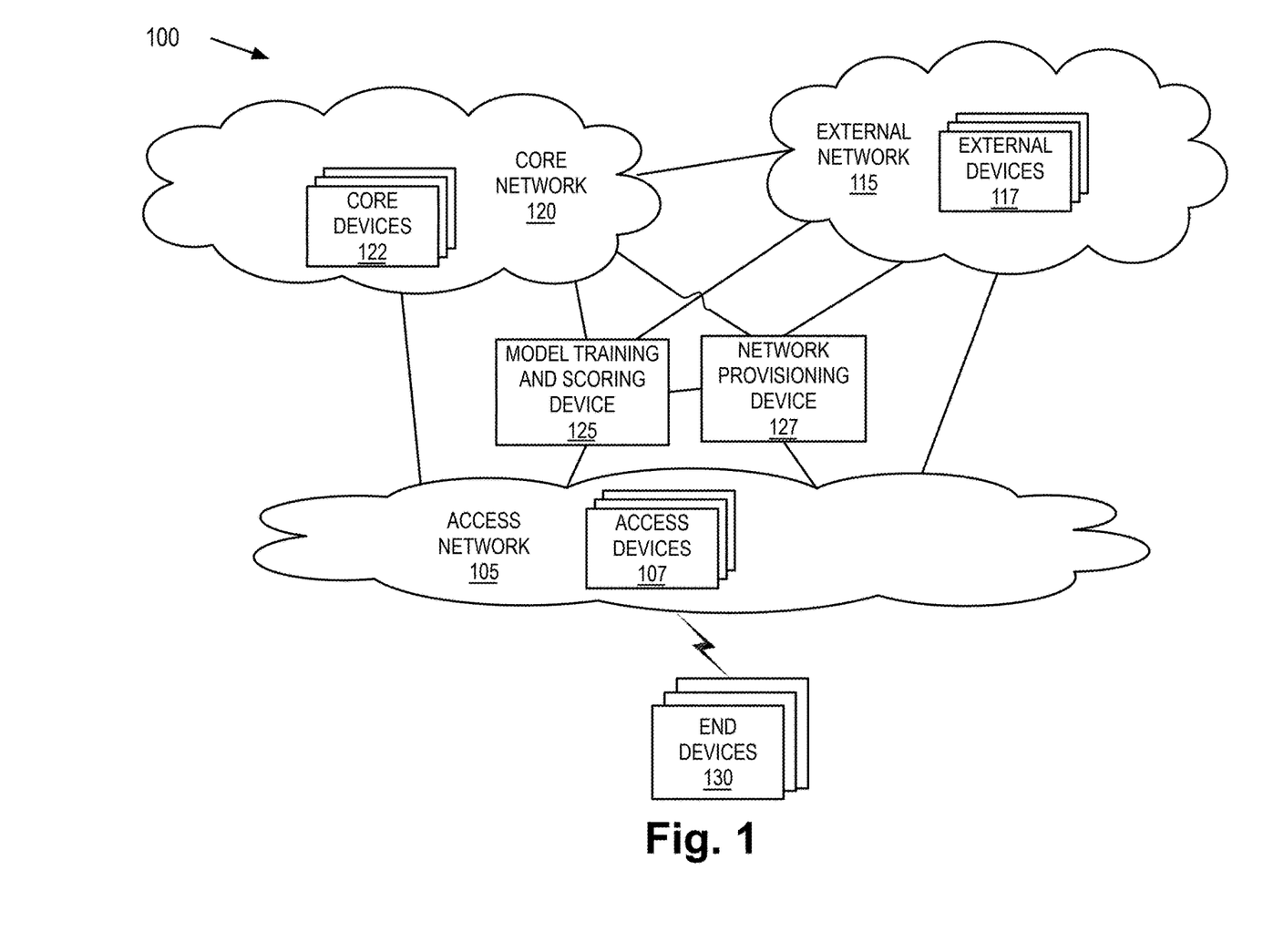
FIG. 1 is a diagram illustrating an exemplary environment in which an exemplary embodiment of a scalable machine learning modeling service may be implemented.

FIG. 1 is a diagram illustrating an exemplary environment 100 in which an exemplary embodiment of a scalable machine learning modeling service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes a model training and scoring device 125, a network provisioning device 127, and end devices 130 (also referred to individually or generally as "end device 130").

The number, type, and arrangement of networks illustrated in environment 100 are exemplary. For example, according to other exemplary embodiments, environment 100 may include fewer networks, additional networks, and/or different networks. For instance, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), virtual, logical, network slice, etc.). The number, the type, and the arrangement of network devices are exemplary. For example, model training and scoring device 125 and network provisioning device 127 may be combined in whole or in part as a single network device.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the scalable machine learning modeling service may use at least one of these planes of communication.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and a core network including an Evolved Packet Core (EPC) network and/or an NG core (NGC) network (not illustrated), or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., RATs, etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an evolved Long Term Evolution (eLTE) evolved Node B (eNB), an eNB, a radio network controller (RNC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. According to some exemplary implementations, access device 107 may include a combined functionality of multiple RATs (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), two dimensional (2D) beamforming, antenna spacing, tilt (relative to the ground), radiation pattern, directivity, elevation, planar arrays, and so forth. Depending on the implementation, access device 107 may provide a wireless access service at a cell, a sector, a sub-sector/zone, carrier, and/or other configurable level. For example, the sub-sector/zone level may include multiple divisions of a geographic area of a sector relative to access device 107.

According to an exemplary embodiment, at least some of access devices 107 include logic of the scalable machine learning modeling service, as described herein. For example, access device 107 may transmit and receive messages pertaining to the scalable machine learning modeling service, as described herein. For example, access device 107 may provide state information pertaining to access device 107 and other RAN-based network elements (e.g., cell, sector, sub-sector/zone, network slice segment, radio bearer, QoS flow, PDU session, protocol layer, etc.) to model training and scoring device 125. Additionally, for example, access device 107 may be provisioned by network provisioning device 127, as described herein.

External network 115 may include one or multiple networks of one or multiple types and technologies that provides an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), network function virtualization infrastructure (NFVI), and/or other types of virtualization elements, layers, hardware resources, operating systems, engines, etc.) that may be associated with application services for use by end devices 130 (not illustrated). By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

According to an exemplary embodiment, at least some of external devices 117 may include logic of the scalable machine learning modeling service, as described herein. For example, external device 117 may transmit and receive messages pertaining to the scalable machine learning modeling service, as described herein. For instance, external device 117 may provide state information pertaining to external device 117 and other external network-based network elements (e.g., container, virtual machine, application service, network slice segment, etc.) to model training and scoring device 125. Additionally, for example, external device 117 may be provisioned by network provisioning device 127, as described herein.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF) (which may include a NW-TT), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a service capability exposure function (SCEF), a lifecycle management (LCM) device, a TSCTSF, a mobility management entity (MME), a packet data network gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, at least some of core devices 122 may include logic of the scalable machine learning modeling service, as described herein. For example, core device 122 may transmit and receive messages pertaining to the scalable machine learning modeling service, as described herein. For example, core device 122 may provide state information pertaining to core device 122 and other core-based network elements (e.g., QoS flow, network slice segment, session, protocol layer, etc.) to model training and scoring device 125. Additionally, for example, access device 107 may be provisioned by network provisioning device 127, as described herein.

Model training and scoring device 125 may include a network device that includes logic of the scalable machine learning modeling service, as described herein. Although model training and scoring device 125 is depicted outside of access network 105, external network 115, and core network 120, such an illustration is exemplary. According to other exemplary implementations, model training and scoring device 125 may reside in one or multiple networks depicted and described herein. Additionally, model training and scoring device 125 may be implemented in a centralized, distributed, and/or another type of network and/or computing architecture as a network device or system, as described herein.

According to an exemplary embodiment, model training and scoring device 125 may include AI/ML logic that calculates prospective network services information. The prospective network services information may pertain to a network slice, an end-to-end network path, a network device, a segment of a network path or network slice, a geographic area associated with a network service, and/or another type of network element, for example.

Model training and scoring device 125 may obtain historical and/or current analytics information. For example, the analytics information may include network service metric parameters and values relating to network elements and/or geographic areas within which a service is provided. According to an exemplary embodiment, model training and scoring device 125 may obtain the analytics information from an NWDAF. According to other exemplary embodiments, model training and scoring device 125 may obtain analytics information from another type of device that may provide real-time analytics data.

According to various exemplary embodiments, the network services metric parameters and values may include key performance indicators (KPIs), Quality of Service (QoS) parameters and values, Quality of Experience (QoE) parameters and values, SLA parameters and values, and/or Mean Opinion Score (MOS) parameters and values, and/or any operational parameter. A network services metric value may be implemented as a single value (e.g., X) or a range of values (e.g., X to Y). The network services metric value may also be associated with a time period (e.g., seconds, hour(s), day(s), and/or another time period), may indicate an average value, a mean value, and/or another statistical value. By way of further example, the network services metric information may relate to data associated with user sessions, connections, channels, messaging, a network procedure (e.g., attachment, handover, session establishment, local breakout, dual connectivity, etc.), application services, and/or other types of metrics in relation to a network element and/or a geographic area associated with a service. The network services metric information may relate to user plane or user plane and control plane events or metrics. As an example, the network services metric information may include information relating to Radio Resource Control (RRC) setup failures, handover attempts, handover failures, radio bearer drops, uplink and/or downlink throughput, voice call drops, random access failures, data volume (e.g., maximum, minimum, etc.), latency, packet error, delay, bit rates (e.g., guaranteed, maximum, minimum, burst, etc.), jitter, retries, 5G QoS Class Identifiers (QCIs) and characteristics, and so forth.

According to an exemplary embodiment, model training and scoring device 125 may use the historic and/or current network services metric value information, and other types of data, as described herein, to tune multiple models pertaining to the same network element (e.g., access device 107, etc.) and set of hyperparameters. According to an exemplary embodiment, model training and scoring device 125 may calculate one or more values of the prospective network services information, as described herein, based on predicted network services metric values for the network elements and/or the geographic areas. For example, predicted network services metric values may correspond to forecasted power usage for thousands of wireless access station elements, workstation devices, etc., over a number of upcoming intervals.

According to an exemplary embodiment, model training and scoring device 125 may provide the prospective network services information to network provisioning device 127. According to various exemplary embodiments, model training and scoring device 125 may be configured to calculate and provide the prospective network services information according to a time schedule, or based on other criteria (e.g., reactively, proactively, etc.).

Network provisioning device 127 may include a network device that includes logic of the scalable machine learning modeling service, as described herein. Although network provisioning device 127 is depicted outside of access network 105, external network 115, and core network 120, such illustration is exemplary. According to other exemplary implementations, network provisioning device 127 may reside in one or multiple networks depicted and described herein. Additionally, network provisioning device 127 may be implemented in a centralized, distributed, and/or another type of network and/or computing architecture as a network device or system, as described herein. According to an exemplary embodiment, network provisioning device 127 may schedule and/or execute the allocation of network resources and/or configurations over specified upcoming intervals based on the prospective network services information obtained from model training and scoring device 125.

End device 130 includes a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, a fixed wireless device, a router, a sensor, an automated guided vehicle (AGV), an industrial robot, or other type of wireless device (e.g., other type of UE). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device.

According to an exemplary embodiment, end device 130 may include logic of the scalable machine learning modeling service, as described herein. For example, end device 130 may transmit and receive messages pertaining to the scalable machine learning modeling service, as described herein. For example, end device 130 may provide state information pertaining to end device 130 and other end device-based network elements (e.g., QoS flow, network slice segment, PDU session, protocol layer, application service, network slice, etc.) to model training and scoring device 125. Additionally, for example, end device 130 may be provisioned by network provisioning device 127, as described herein.

Figure 2:
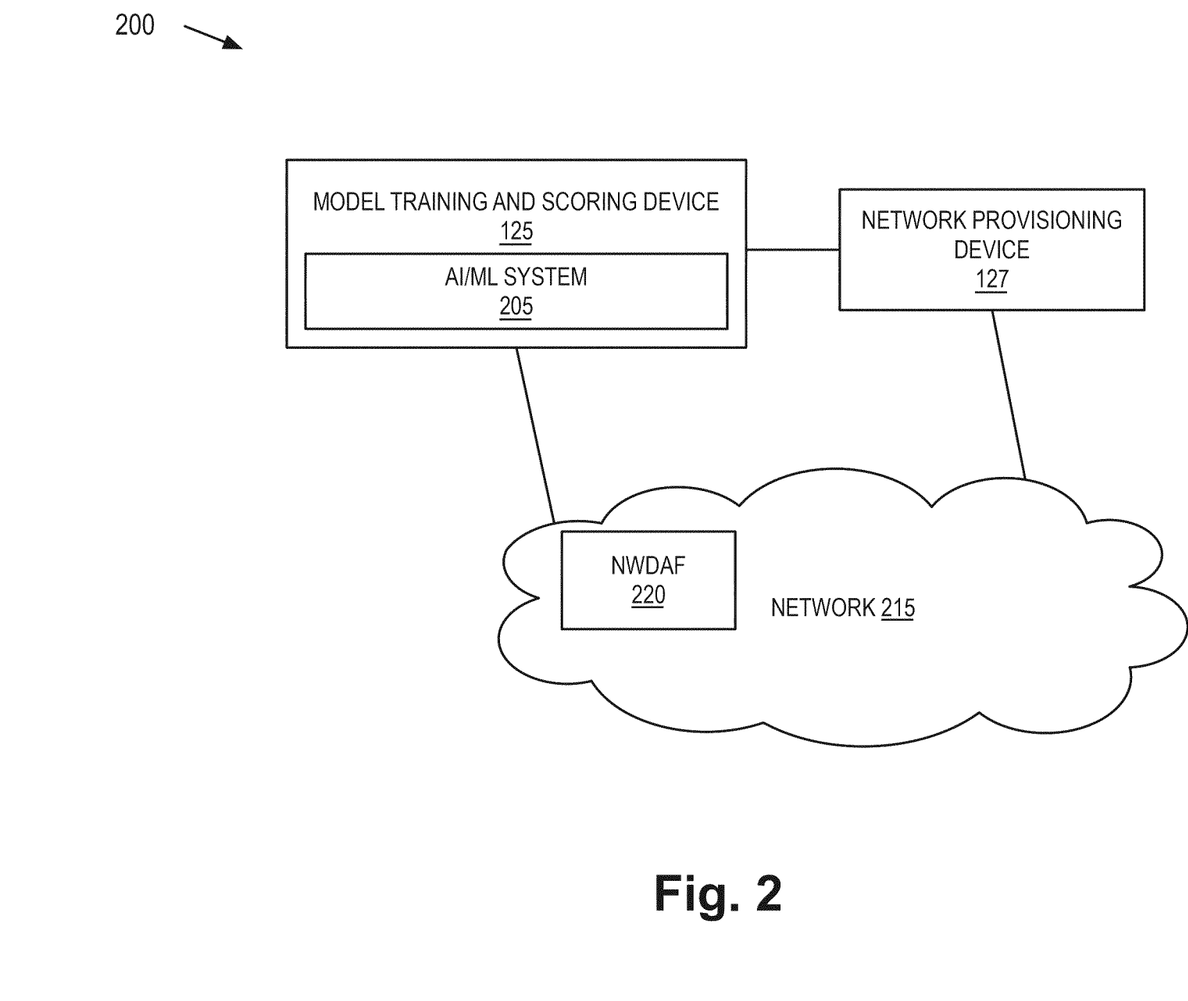
FIG. 2 is a diagram illustrating another exemplary environment in which an exemplary embodiment of the scalable machine learning modeling service may be implemented.

FIG. 2 is a diagram illustrating another exemplary environment 200 in which an exemplary embodiment of the scalable machine learning modeling service may be implemented. As illustrated, environment 200 may include a model training and scoring device 125, a network provisioning device 127, a network 215, and an NWDAF 220. Similar to the description of environment 100, the number, type, and arrangement of network devices, end devices 130, communication links, and so forth, may be different in other embodiments.

Model training and scoring device 125 may include an AI/ML system 205, as described herein. AI/ML logic 205 may include a model inference engine capable of generating one or multiple types of forecasting models. For example, the forecasting models may include a time series model, a forecast model, a clustering model, and/or a classification model. The forecasting models may include a tree-based algorithm, a regressive algorithm, and/or another type of AI/ML algorithm or logic, such as Naïve Bayes, K-Nearest Neighbors, decision tree, Random Forest, gradient boosting, support vector machine, clustering via embedding, a dense neural network, a convolutional neural network, a recurrent neural network, an autoencoder, and/or the like. AI/ML system 205 may calculate prospective network services information pertaining to a network element and/or a geographic area based on network topology information, historical and current network services metric value information, and other types of data, as described herein.

Network provisioning device 127 may include logic that provides a scalable machine learning modeling service. For example, network provisioning device 127 may include logic that calculates for the provisionment, configuration, and modification of various types of network service elements and/or scopes of geographic areas based on the prospective network services metric information. According to an exemplary embodiment, network provisioning device 127 may compare current network services metric information with the prospective network services metric information (e.g., network services metric parameters and values, probability values, confidence values, etc.). Based on a result of the comparison, network provisioning device 127 may determine whether a network services metric associated with a class of network elements and/or a geographic area satisfies a prospective network services metric.

Network provisioning device 127 may also use policies/rules, historical network services information, network dependency information associated with a network (e.g., access network 105, core network 120, etc.), a network device (e.g., access device 107, core device 122, etc.), a network slice (e.g., 5QIs, etc.), a segment of a network slice, application services, and various network elements, as described herein, for provisioning of forecasted network services. For example, for forecasted service provisioning relating to a sector or sub-sector area of a cell site, the network dependency information may include the type of end device 130 and associated capabilities (e.g., IoT device versus smartphone), parameters associated with access device 107 of relevance, connection (e.g., SA, NSA, etc.), transport information (e.g., differentiated services code point (DSCP), type of service (ToS), or the like), service classification (e.g., fixed, mobile, IoT, etc.), core devices 122 of relevance, network slice information (5QI, etc.), external device 117 of relevance, the application service (e.g., VR versus web browsing), and so forth.

According to an exemplary embodiment, network provisioning device 127 may include AI/ML logic that identifies parameters and generates templates that enable the provisioning of network resources and configurations such that forecasted network service metrics may be optimally projected when prospective network services metrics may underperform or when prospective network performance may overperform. AI/ML logic may compare historical datasets to current analytics as a basis for selection of a template and associated parameters and values that may be used.

Network 215 may include access network 105, core network 120, external network 115, and/or other types of networks, as described herein. NWDAF 220 may provide a function and/or a service in accordance with a network standard (e.g., 3GPP, 3GPP2, ITU, ETSI, GSMA, and/or the like) and/or of a proprietary nature. For example, NWDAF 220 may collect data from network devices and operations, administration, and maintenance (OAM) systems across one or multiple networks or domains (e.g., core, cloud, etc.) via standard interfaces of a service-based architecture. NWDAF 220 may obtain data (e.g., statistics, metric values, events, etc.) from such devices/networks and may provide data analytics functions that may be configured by a network operator, for example. Additionally, for example, NWDAF 220 may include logic of an exemplary embodiment of the scalable machine learning modeling service, as described herein. For example, NWDAF 220 may obtain current state information, which may include current network services metric information, for various types and granularities of network elements, geographic areas, and time periods (e.g., seconds, hour(s), day(s), and/or another time period) across one or multiple networks, geographic service areas, and virtual/logical domains.

NWDAF 220 may generate current network analytics information and provide the current analytics information, which may include current network services metric parameters and values, as described herein, to model training and scoring device 125 and/or AI/ML system 205. The current analytics information may include current network services metric parameters and values. The current network services metric value may be implemented as a single value (e.g., X) or a range of values (e.g., X to Y). The current network services metric value may also be associated with one or more time intervals, may indicate an average value, a mean value, and/or another statistical value. The current network services metric value may also be associated with a class of network elements and/or a geographic service area, as described herein. In some embodiments, one or more functions described as being performed by NWDAF 220 may additionally, or alternatively performed by a data collection/ analytics device of model training and scoring device 125.

Figure 3A:
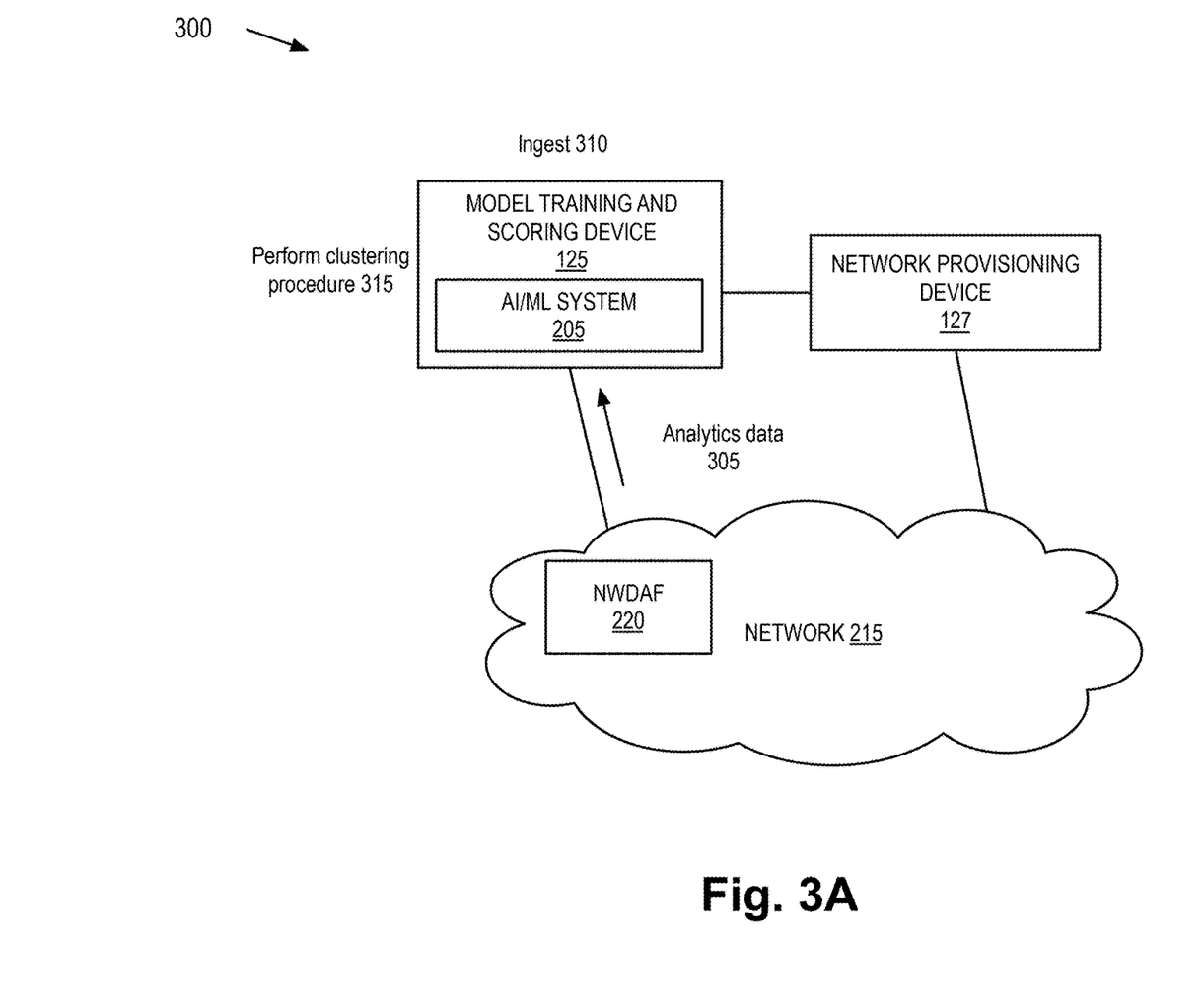
FIGS. 3A-3C are diagrams illustrating an exemplary process of an exemplary embodiment of the scalable machine learning modeling service.
Figure 3B:
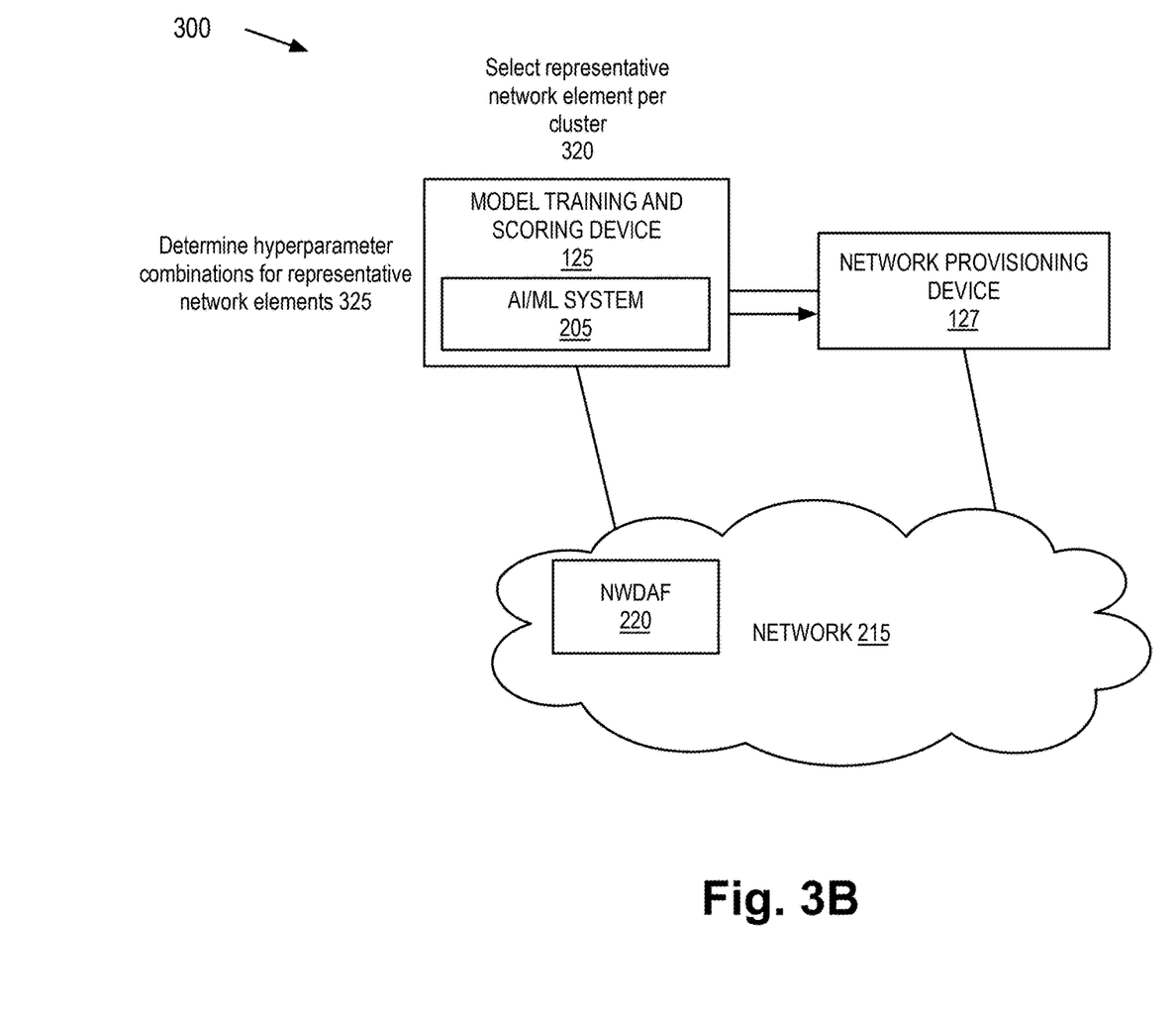
Figure 3C:
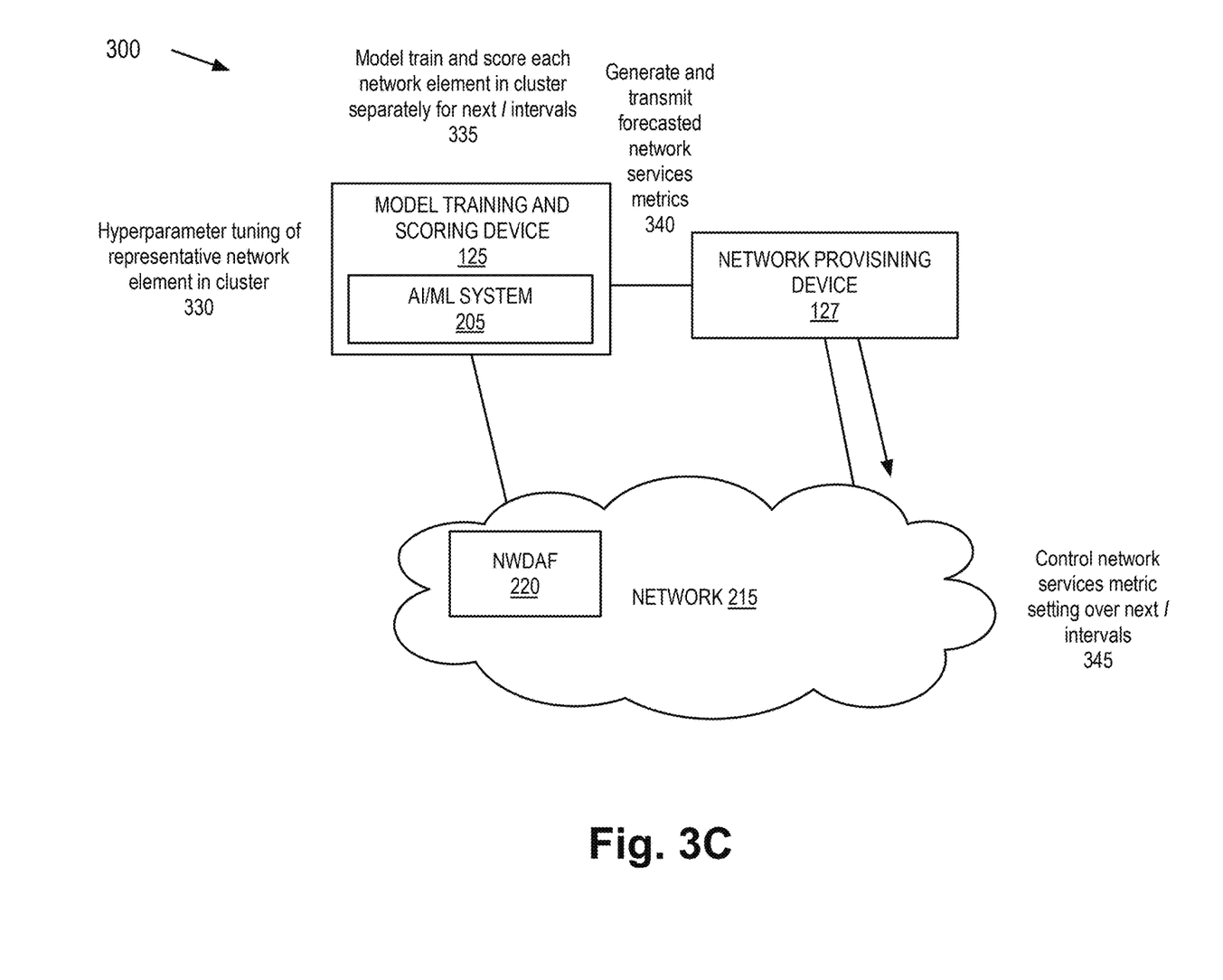

FIGS. 3A-3C are diagrams illustrating an exemplary process 300 of an exemplary embodiment of the scalable machine learning modeling service. As illustrated, referring to FIG. 3A, model training and scoring device 125 may ingest 310 data obtained, for example, from NWDAF 220 (e.g., current analytics data 305). According to an exemplary embodiment, model training and scoring device 125 may obtain historical instances of data, over a configurable number of time intervals, for a select number (10's or 100's of thousands) of entities, such as network elements (e.g., RAN devices), nodes, or the like.

AI/ML system 205 may perform a clustering procedure 315, based on the obtained data, to form multiple network element clusters that vary in number of network elements (e.g., from about 2 to 1,000 or more). For example, AI/ML system 205 may identify a configurable number of network elements per cluster by converting entity data into time series data using methods such as dynamic time warping scores (DTWS), autoencoders, and other techniques. DTWS may include a technique for comparing and/or measuring the similarity between time sequences. In DTWS, a numerical representation of the "closeness" of any two points in the time sequences may be determined and plotted in a distance matrix. The best match among the time series may be determined by examining the values in the distance matrix.

Referring to FIG. 3B, AI/ML system 205 may select a representative network element 320 from among the network elements in a cluster. In one embodiment, AI/ML system 205 may determine which network element in a cluster holds the most statistical significance, and select that network element to be the representative. For example, AI/ML system 205 may use the analytic data to identify a network element with a fewest number of anomalies and sufficient number of change points for a configurable number of past and/or current intervals. As an example, assume a particular access device 107 was impacted by a major storm resulting in anomalous data. AI/ML system 205 may identify the anomalous data, discount and/or substitute for such data, and use data associated with other access devices 107 (e.g., in the same region) so that the effect of the one-off data for future predictions is mitigated. In some embodiments, the selection of the representative for a cluster may be in accordance with a required sample size and/or other statistical criteria.

In step 325, AI/ML system 205 may determine hyperparameter combinations for each of one or more of the representative network elements 325. In one embodiment, AI/ML system 205 may search a hyperparameter space associated with analytics data for each representative network. For example, AI/ML system 205 may evenly obtain samples from the hyperparameter space for each representative network element and find performance and/or fit for all the representative network elements on each sample. In this manner, AI/ML system 205 may obtain a cross validation error for each network element for each set of hyperparameter combinations. Additionally, AI/ML system 205 may use a Bayesian hyperparameter optimization ("update") to find the next step for each representative and parallelize the performance computation among the representatives. In this manner, AI/ML system 205 may, for each network element, obtain the next best hyperparameters using Bayesian search, and compute the cross-validation error on the same and repeat the calculation until convergence is determined. In some embodiments, other sequential hypothesis testing besides Bayesian optimization may be used, in which the sample size is not fixed in advance.

Referring to FIG. 3C, AI/ML system 205 may perform hyperparameter tuning of the representative network element in a cluster 330. Once the single "best" set of hyperparameters is determined for a cluster, AI/ML system 205 may assign the set to each network element in a cluster and avoid searching their associated hyperparameter spaces with each of their individual datapoints. Because the hyperparameter set is determined for each network element, AI/ML system 205 may individually train each model and score forecasted network services metrics over the next/intervals 335.

Model training and scoring device 125 may forward the forecasted network services metrics 340 for some or all of the network elements to network provisioning device 127. Network provisioning device 127 may receive the forecasted network services metrics, and in response, compare the information with current network services values. Network provisioning device 127 may determine whether a network setting should be maintained or adjusted. For example, network provisioning device 127 may make this determination based on a result of the comparison, policies/rules, historical network performance information, and network dependency information. As further illustrated, network 215 may control a network services metric setting 345. For example, according to an exemplary scenario, access device 107 may supply various power parameters pertaining to the RAN optimize power resources prospectively. Additionally, or alternatively, the configuration of multiple network devices (e.g., an RU, a CU, and a UPF), which may or may not service the sub-sector and end device 130, may be controlled.

According to other exemplary embodiments and scenarios, process 300 may include additional operations, fewer operations, and/or different operations that may be performed.

Figure 4:
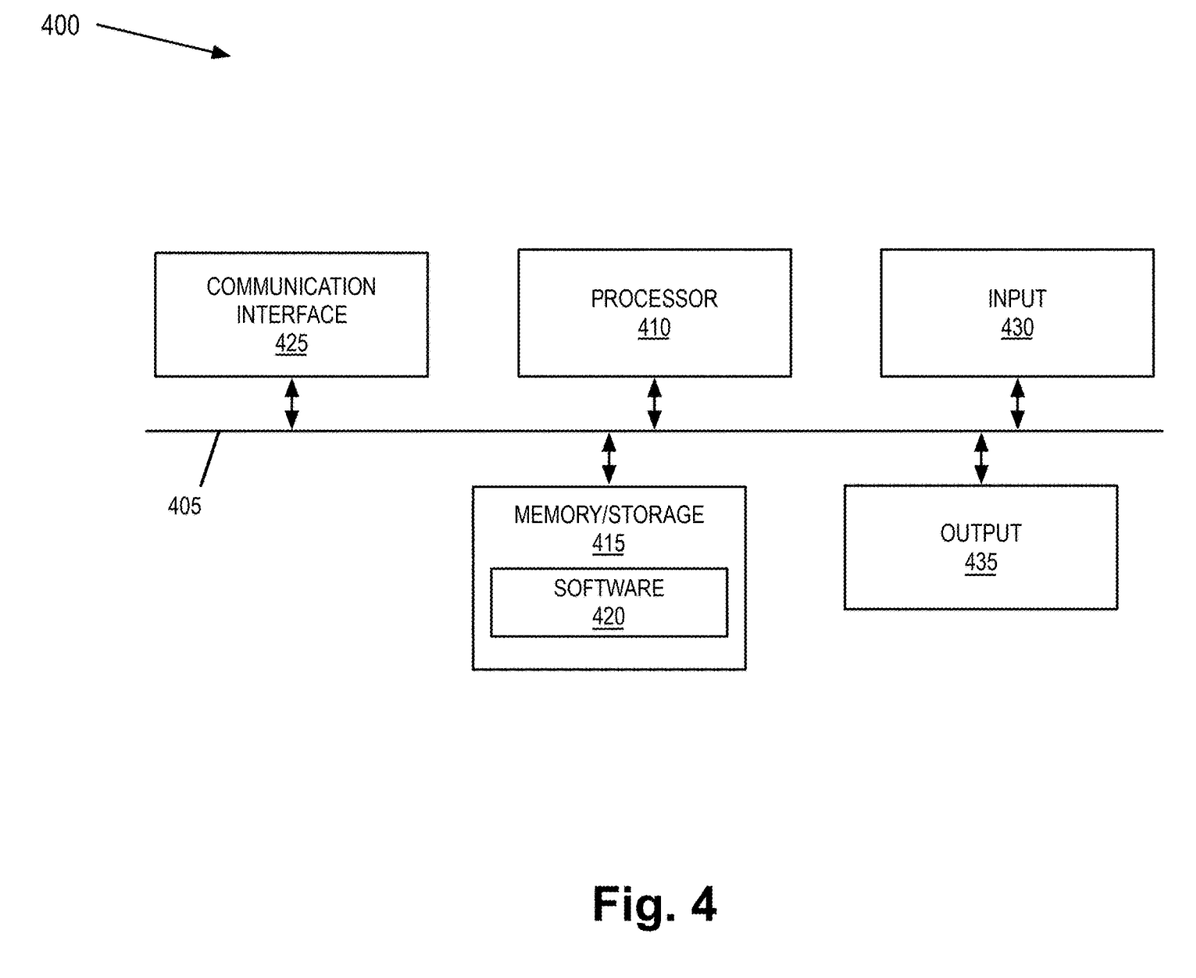
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, external device 117, core device 122, model training and scoring device 125, network provisioning device 127, end device 130, AI/ML system 205, NWDAF 220, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, universal serial bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to AI/ML system 205, software 420 may include an application that, when executed by processor 410, provides a function and/or a process of scalable machine learning modeling service, as described herein. Additionally, for example, with reference to network provisioning device 127, software 420 may include an application that, when executed by processor 410, provides a function and/or a process of scalable machine learning modeling service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces, optical interfaces, and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
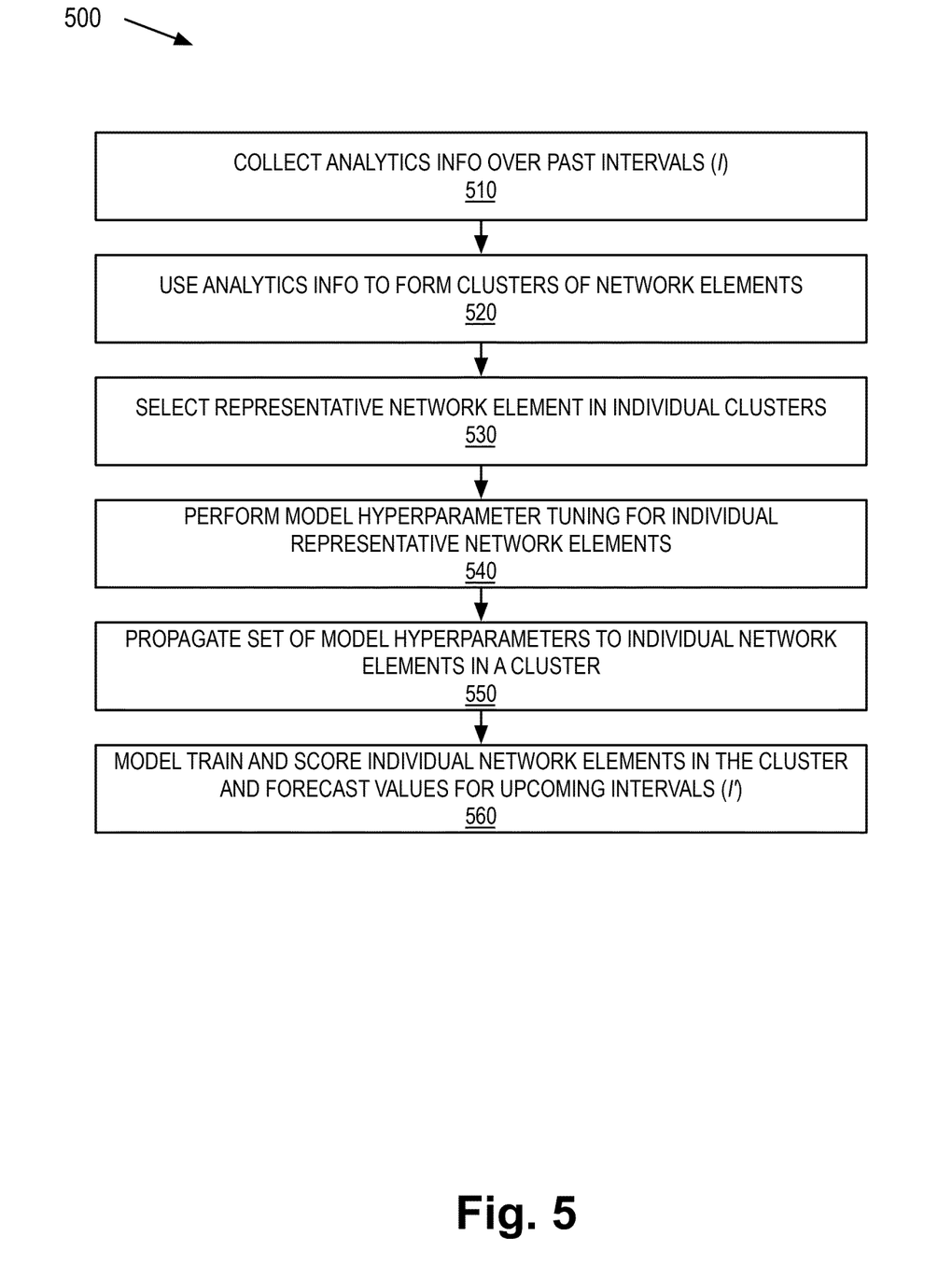
FIG. 5 is a flow diagram illustrating another exemplary process of an exemplary embodiment of the scalable machine learning modeling service.

FIG. 5 is a flow diagram illustrating an exemplary process 500 of an exemplary embodiment of the scalable machine learning modeling service. According to an exemplary embodiment, model training and scoring device 125 may perform a step of process 500. According to an exemplary implementation, processor 410 executes software 420 to perform a step of process 500, as described herein. Alternatively, a step may be performed by execution of only hardware.

In block 510, model training and scoring device 125 may receive historical and/or current analytics information. For example, the current analytics information may include a network services metric parameter and a value relating to a network element and/or a geographic area within which a service is provided, as described herein. The current analytics information may include historical time period information for a configurable number of past intervals I.

In block 520, model training and scoring device 125 may use the analytics information to perform a clustering procedure for the network elements. For example, model training and scoring device 125 may identify a configurable number of network elements per cluster by converting entity data into time series data using methods such as dynamic time warping scores (DTWS), autoencoders, and other techniques. In some embodiments, each cluster may be represented by a vector generated from its target and feature resulting in groups of network elements which exhibit similar behavior under a machine learning model. The clusters may include varying, configurable numbers of network elements.

In block 530, network provisioning device 127 may select a representative network element from among the network elements in the individual clusters using various criteria, as described herein.

In block 540, network provisioning device 127 may perform model hyperparameter tuning for the individual representative network elements. For example, the tuning may include searching of the hyperparameter spaces associated with the representative network elements and not those of the other network elements of the cluster. As described herein, the searching may use Bayesian optimization and parallelizing the cold start and thereafter tuning at an entity level to conserve network resources.

In block 550, network provisioning device 127 may propagate a set of model hyperparameters to the other network elements in a cluster. In block 560, network provisioning device 127 may separately model train and score the individual network elements in the cluster and forecast values for a configurable number of upcoming intervals I'. In one embodiment, the number of upcoming intervals I' may be a function of the number of number of past intervals I.

FIG. 5 illustrates an exemplary process of the scalable machine learning modeling service, according to other exemplary embodiments, the scalable machine learning modeling service may perform additional operations, fewer operations, and/or different operations than those illustrated and described As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    receiving, by a network device, analytics datasets pertaining to a network services metric and collected for a plurality of network elements over a number of past intervals;
    performing, by the network device, a clustering procedure to generate a plurality of clusters formed using the analytics data for the plurality of network elements, wherein each cluster includes multiple network elements;
    selecting, by the network device, a representative network element of the multiple network elements for each of the plurality of clusters;
    determining, by the network device, a set of model hyperparameters for each of the plurality of clusters based on searching of hyperparameter spaces associated with each representative network element;
    applying, by the network device, the respective sets of model hyperparameters for use in tuning each of the multiple network elements in each respective cluster;
    model training, by the network device, each of the multiple network elements in each of the respective clusters to score the network services metric for a number of upcoming intervals; and
    allocating, by the network device, network resources to each of the multiple network elements over one or more of the upcoming intervals based on the scoring,
    wherein selecting the representative network element comprises determining that the analytics data of the representative network element holds the most statistical significance of any of the multiple network elements.

2. The method of claim 1, wherein the plurality of network elements includes a plurality of radio access network (RAN) devices, the allocating further comprising:
    allocating power resources to the plurality of RAN devices over each of the upcoming intervals.

3. The method of claim 1, wherein performing the clustering procedure comprises grouping the multiple network elements based on similarities in the analytics datasets.

4. The method of claim 1, wherein the searching comprises applying Bayesian optimization to determine the model hyperparameters and generate a Bayesian update.

5. The method of claim 4, wherein the searching further comprises:
    evenly sampling an initial set of the hyperparameter spaces; and
    parallelizing, using the Bayesian update, a performance computation among the multiple network elements.

6. The method of claim 4, wherein the searching further comprises computing a next set of the hyperparameter spaces in the multiple network devices.

7. A network device comprising:
    a processor configured to:
    receive analytics datasets pertaining to a network services metric and collected for a plurality of network elements over a number of past intervals;
    perform a clustering procedure to generate a plurality of clusters formed from the analytics data for the plurality of network elements, wherein each cluster includes multiple network elements;
    select a representative network element of the multiple network elements for each of the plurality of clusters;
    determine a set of model hyperparameters for each of the plurality of clusters based on searching of hyperparameter spaces associated with each representative network element;
    apply the respective sets of model hyperparameters for use in tuning each of the multiple network elements in each respective cluster;
    model train each of the multiple network elements in each of the respective clusters to score the network services metric for a number of upcoming intervals; and
    allocate, based on the scoring, network resources to each of the multiple network elements over one or more of the upcoming intervals,
    wherein the processor configured to select the representative network element is further configured to determine that the analytics data of the representative network element holds the most statistical significance of any of the multiple network elements.

8. The network device of claim 7, wherein the plurality of network elements includes a plurality of radio access network (RAN) devices, and
    wherein the processor is further configured to allocate power resources to the plurality of RAN devices over each of the upcoming intervals.

9. The network device of claim 7, wherein, when performing the clustering procedure, the processor is further configured to group the multiple network elements based on similarities in the analytics datasets.

10. The network device of claim 7, wherein, when searching, the processor is further configured to apply Bayesian optimization to determine the model hyperparameters and generate a Bayesian update.

11. The network device of claim 10, wherein, when searching, the processor is further configured to:
    evenly sample an initial set of the hyperparameter spaces; and
    parallelize, using the Bayesian update, a performance computation among the multiple network elements.

12. The network device of claim 10, wherein, when searching, the processor is further configured to compute a next set of the hyperparameter spaces in the multiple network elements.

13. A non-transitory computer-readable storage medium storing instructions executable by a processor of a network device, wherein the instructions are configured to:
- receive analytics datasets pertaining to a network services metric and collected for a plurality of network elements over a number of past intervals;
- perform a clustering procedure to generate a plurality of clusters formed from the analytics data for the plurality of network elements, wherein each cluster includes multiple network elements;
- select a representative network element of the multiple network elements for each of the plurality of clusters;
- determine a set of model hyperparameters for each of the plurality of clusters based on searching of hyperparameter spaces associated with each representative network element;
- apply the respective sets of model hyperparameters for use in tuning each of the multiple network elements in each respective cluster;
- model train each of the multiple network elements in each of the respective clusters to score the network services metric for a number of upcoming intervals; and
- allocate, based on the scoring, network resources to each of the multiple network elements over one or more of the upcoming intervals, wherein the instructions configured to select the representative network element further comprise instructions configured to determine that the analytics data of the representative network element holds the most statistical significance of any of the multiple network elements.

14. The non-transitory computer-readable storage medium of claim 13, wherein, when performing the clustering procedure, the instructions are further configured to group the multiple network elements based on similarities in the analytics datasets.

15. The non-transitory computer-readable storage medium of claim 13, wherein, when searching, the instructions are further configured to apply Bayesian optimization to determine the model hyperparameters and generate a Bayesian update.

16. The non-transitory computer-readable storage medium of claim 15, wherein, when searching, the instructions are further configured to:
- evenly sample an initial set of the hyperparameter spaces; and
- parallelize, using the Bayesian update, a performance computation among the multiple network elements.

17. The non-transitory computer-readable storage medium of claim 15, wherein, when searching, the instructions are further configured to compute a next set of the hyperparameter spaces in the multiple network elements.

18. The non-transitory computer-readable storage medium of claim 13, wherein the plurality of network elements includes a plurality of radio access network (RAN) devices, and
wherein the instructions are further configured to allocate power resources to the plurality of RAN devices over each of the upcoming intervals.

19. The method of claim 1, wherein the selecting the representative network element comprises determining a network element having a fewest number of anomalies and sufficient number of change points.

20. The network device of claim 7, wherein the processor configured to select the representative network element is further configured to determine a network element having a fewest number of anomalies and sufficient number of change points.

* * * * *